(12) United States Patent
Niu et al.

(10) Patent No.: US 11,877,303 B2
(45) Date of Patent: Jan. 16, 2024

(54) METHODS AND SYSTEMS FOR TRANSMITTING AND RECEIVING SYSTEM INFORMATION IN A WIRELESS COMMUNICATION SYSTEM

(71) Applicant: ZTE CORPORATION, Guangdong (CN)

(72) Inventors: Li Niu, Guangdong (CN); Yajun Zhao, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 431 days.

(21) Appl. No.: 17/313,805

(22) Filed: May 6, 2021

(65) Prior Publication Data
US 2021/0258985 A1    Aug. 19, 2021

Related U.S. Application Data

(63) Continuation of application No. PCT/CN2018/114306, filed on Nov. 7, 2018.

(51) Int. Cl.
*H04W 72/50* (2023.01)
*H04W 72/0446* (2023.01)
(Continued)

(52) U.S. Cl.
CPC ..... *H04W 72/535* (2023.01); *H04W 72/0446* (2013.01); *H04W 72/1263* (2013.01); *H04W 72/23* (2023.01)

(58) Field of Classification Search
CPC ........... H04W 72/535; H04W 72/0446; H04W 72/1263; H04W 72/23
See application file for complete search history.

(56) References Cited

U.S. PATENT DOCUMENTS

| | | | |
|---|---|---|---|
| 2010/0272017 A1* | 10/2010 | Terry | H04W 48/12 370/328 |
| 2015/0382284 A1 | 12/2015 | Brismar et al. | |
| 2016/0345314 A1* | 11/2016 | Webb | H04L 5/0055 |

FOREIGN PATENT DOCUMENTS

| | | | |
|---|---|---|---|
| CN | 105557037 A | 5/2016 | |
| CN | 107438265 A | 12/2017 | |

(Continued)

OTHER PUBLICATIONS

NTT Docomo, Inc., "SIB scheduling for LC/EC MTC UE", 3GPP TSG-RAN2#90 R2-152336, May 29, 2015 (May 29, 2015), 3 pages.

(Continued)

*Primary Examiner* — Mohammad S Anwar
(74) *Attorney, Agent, or Firm* — Duane Morris LLP (57) ABSTRACT

Methods and systems for enhanced transmission and reception of system information (SI) are disclosed herein. In one embodiment, a method for transmitting/receiving SI, includes: transmitting/receiving a first SI message in a plurality of first SI windows, each first SI window having a first length and a first periodicity; and transmitting/receiving the first SI message in a plurality of second SI windows, each second SI window having a second length and a second periodicity, wherein each second SI window follows immediately after a respective first SI window to provide a plurality of first extended SI windows, each first extended SI window having the second periodicity and an increased length equal to the sum of the first and second lengths.

20 Claims, 4 Drawing Sheets

(51) Int. Cl.
H04W 72/1263 (2023.01)
H04W 72/23 (2023.01)

(56) References Cited

FOREIGN PATENT DOCUMENTS

| | | | |
|---|---|---|---|
| CN | 107889192 A | 4/2018 | |
| CN | 108024380 A | 5/2018 | |
| CN | 111869282 A | 10/2020 | |
| WO | WO-2015066645 A1 * | 5/2015 | ............... H04B 7/26 |
| WO | 2015109521 A1 | 7/2015 | |
| WO | 2015127619 A1 | 9/2015 | |

OTHER PUBLICATIONS

ZTE, "Further considerations on SIB(s) for MTC enhancement", 3GPP TSG RAN WG1 Meeting #82 R1-154039, Aug. 28, 2015 (Aug. 28, 2015), 5 pages.

Samsung "Mapping between SI messages and SI Windows in NR-U", 3GPP TSG-RAN2 103bis, R1-1813692, Chengdu, China, Oct. 8-12, 2018 (Sep. 26, 2018), 3 pages.

* cited by examiner

METHODS AND SYSTEMS FOR TRANSMITTING AND RECEIVING SYSTEM INFORMATION IN A WIRELESS COMMUNICATION SYSTEM

TECHNICAL FIELD

The disclosure relates generally to wireless communications and, more particularly, to methods and systems for transmitting and receiving system information in a wireless communication network.

BACKGROUND

In Long Term Evolution (LTE) wireless communication systems, as well as Next Generation (NG) wireless communication systems (i.e., 5G) currently being developed, the transmission and reception of system information (SI) is necessary to enable communications between a base station (BS) and a user equipment device (UE). The SI typically consists of a Master Information Block (MIB) and a number of System Information Blocks (SIBs). The MIB is broadcast on the Physical Broadcast Channel (PBCH), while the SIBs are transmitted on the Physical Downlink Shared Channel (PDSCH) through Radio Resource Control (RRC) messages (referred to herein as "SI messages"). An SI message can contain one or more Ms. The contents and purpose of the MIB and the various defined SIBs (e.g., SIB1, SIB2, . . . SIB13) are known in the art and need not be explained herein. The transmission time and periodicity for the MIB and SIB1 are fixed by the LTE and 5G specifications. Thus, a UE knows exactly when to listen for them. The transmission times and periodicities of other SIBs are configurable and identified by information contained in SIB1.

When using licensed spectrum, in order to ensure that a UE can access a cell (i.e., coverage area) of a BS, the BS must transmit the SI about the cell to the UE. When the UE receives the SI, the UE reads the SI and then accesses the cell in accordance with the parameters and information contained in the SI. The SI can be transmitted in multiple SIBs, such as SIB1 to SIB9. One or more SIBs can be contained in a single SI message to provide flexible and configurable transmission of SI messages. Additionally, a BS (e.g., an eNB or gNB) can broadcast multiple SI messages to a UE, each SI message staggered from one another in the time domain. For example, SIB2 and SIB3 can be contained in a first SI message (SIM1), and SIB4 and SIB5 can be contained in a second SI message (SIM2), and SIB6-SIB9 can be contained in a third SI message (SIM3).

Each SI message is transmitted within periodically occurring time-domain windows referred to herein as "SI windows," each SI window having the same length (i.e., time duration) for all SI messages. Each SI message is associated with a SI window and the SI windows of different SI messages do not overlap. In advance of sending the SI to the UE, the BS broadcasts a list of SI messages and mapping information for each SI message in SIB1. The BS may further broadcast the SI window length and the SI window periodicity for each SI message.

With the rapid growth of user data, the demand for spectrum is increasing. However, the licensed spectrum is almost fully allocated and expensive for system operators to license. By comparison, unlicensed spectrum is free and easy to deploy for operators, and has more band options and greater bandwidth, such as 2.4 GHz. Therefore, the deployment of the unlicensed spectrum to provide services for users is becoming increasingly attractive for operators.

Since the unlicensed spectrum is a shared spectrum, UEs must compete with each other to gain channel access and use the unlicensed spectrum within a particular geographic area. That is, a UE must preempt an unlicensed spectrum link before sending data on that link. If the preemption succeeds, the UE can send the data. Otherwise, the UE must continue attempting to preempt the link until it is successful. To establish a fair preemption mechanism, the Third Generation Partnership Project (3GPP) and European Telecommunications Standards Institute (ETSI) have introduced a "Listen Before Talk" (LBT) mechanism. Under the LBT mechanism, before sending data, the sender listens or senses whether the channel is idle or busy. If the channel is idle, the sender can use the channel to send data, otherwise, the sender cannot send data. As a result, when SI needs to be transmitted using an unlicensed link, a UE can only receive such SI after it successfully completes the LBT protocol. Due to the timing requirements for receiving SI information, the LBT mechanism may prevent the timely reception of SI using conventional methods of transmitting and receiving SI. Thus, existing systems and methods for transmitting and receiving SI are not entirely satisfactory.

SUMMARY OF THE INVENTION

The exemplary embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

In one embodiment, a method for transmitting system information (SI), includes: transmitting a first SI message in a plurality of first SI windows, each first SI window having a first length and a first periodicity; and transmitting the first SI message in a plurality of second SI windows, each second SI window having a second length and a second periodicity, wherein each second SI window follows immediately after a respective first SI window to provide a plurality of first extended SI windows, each first extended SI window having the second periodicity and an increased length equal to the sum of the first and second lengths.

In another embodiment, a method for receiving system information (SI), includes: receiving a first SI message in a plurality of first SI windows, each first SI window having a first length and a first periodicity; and receiving the first SI message in a plurality of second SI windows, each second SI window having a second length and a second periodicity, wherein each second SI window follows immediately after a respective first SI window to provide a plurality of first extended SI windows, each first extended SI window having the second periodicity and an increased length equal to the sum of the first and second lengths.

In further embodiments, the invention provides a non-transitory computer-readable storage medium storing computer-executable instructions that when executed perform any one of the methods disclosed herein.

In yet further embodiments, a network node includes a memory storing computer-executable instructions that when executed perform any one of the methods disclosed herein; and at least one processor, coupled to the memory, and configured to execute the computer-executable instructions.

BRIEF DESCRIPTION OF THE DRAWINGS

Various exemplary embodiments of the present disclosure are described in detail below with reference to the following Figures. The drawings are provided for purposes of illustration only and merely depict exemplary embodiments of the present disclosure to facilitate the reader's understanding of the present disclosure. Therefore, the drawings should not be considered limiting of the breadth, scope, or applicability of the present disclosure. It should be noted that for clarity and ease of illustration these drawings are not necessarily drawn to scale.

DETAILED DESCRIPTION OF EXEMPLARY EMBODIMENTS

Various exemplary embodiments of the present disclosure are described below with reference to the accompanying figures to enable a person of ordinary skill in the art to make and use the present disclosure. As would be apparent to those of ordinary skill in the art, after reading the present disclosure, various changes or modifications to the examples described herein can be made without departing from the scope of the present disclosure. Thus, the present disclosure is not limited to the exemplary embodiments and applications described and illustrated herein. Additionally, the specific order and/or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

As discussed herein, a BS can include, or be implemented as, a next Generation Node B (gNB), an E-UTRAN Node B (eNB), a Transmission Reception Point (TRP), an Access Point (AP), a donor node (DN), a relay node, a core network (CN) node, a RAN node, a master node, a secondary node, a distributed unit (DU), a centralized unit (CU), etc. A UE can include, or be implemented as, a mobile terminal (MT), mobile station (MS), a station (STA), etc., in accordance with the customary understanding of these terms in the art. A BS may be described herein as a non-limiting example of a "wireless communication node" and a UE may be described herein as a non-limiting example of a "wireless communication device." Additionally, a BS and a UE may be collectively referred to herein as non-limiting examples of a "network node."

Figure 1:
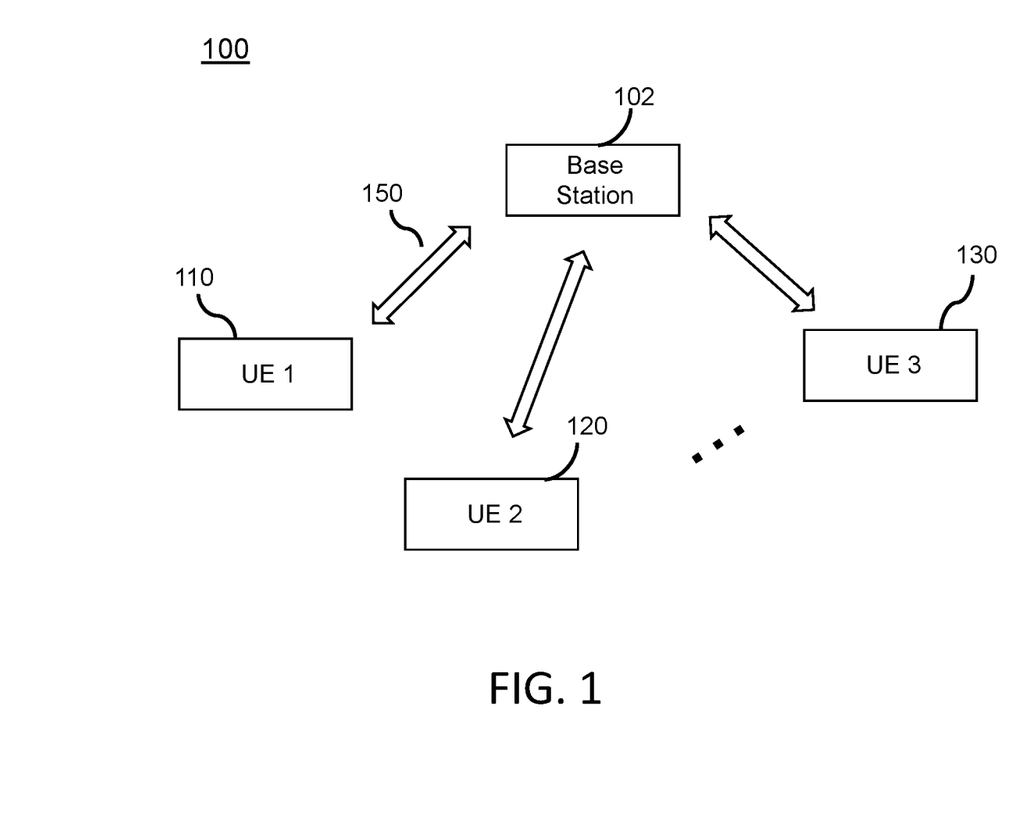
FIG. 1 illustrates a block diagram of an exemplary communication network in which techniques disclosed herein may be implemented, in accordance with some embodiments of the invention.

FIG. 1 illustrates an exemplary communication network 100 in which techniques disclosed herein may be implemented, in accordance with some embodiments of the invention. As shown in FIG. 1, the exemplary communication network 100 includes a base station (BS) 102 and a plurality of UEs, 110, 120 and 130 communicatively coupled to the BS 102 via respective RF links 150. In some embodiments, the RF links 150 are unlicensed links. Thus, the present disclosure describes systems and methods for providing enhanced transmission and reception of SI in a wireless communication network utilizing unlicensed spectrum, in accordance with various embodiments.

Figure 2:
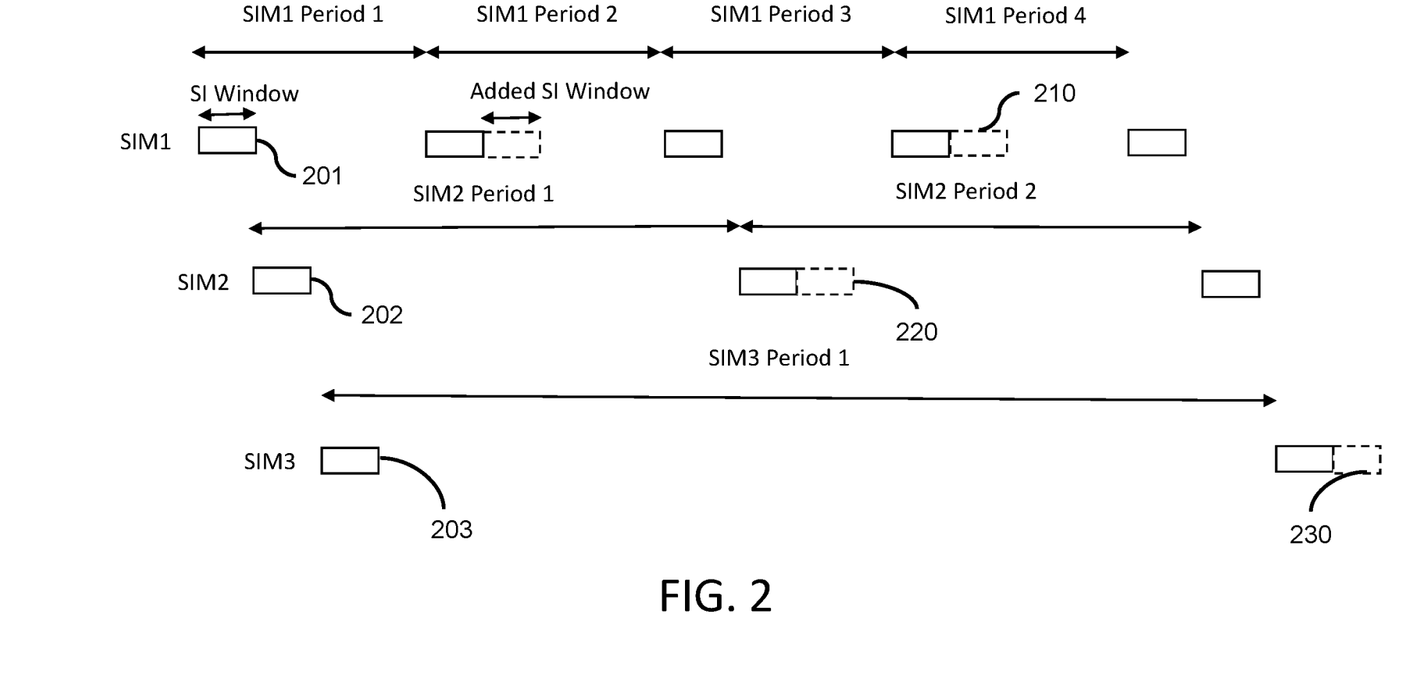
FIG. 2 illustrates a timing diagram for an enhanced method of transmitting a plurality of SI messages, in accordance with some embodiments of the invention.

FIG. 2 illustrates a timing diagram of an enhanced method of transmitting and receiving system information, in accordance with some embodiments. A shown in FIG. 2, a first SI message (SIM1) is transmitted in a first SI window 201 have a first predetermined length and a first predetermined periodicity. For example, the first SI window 201 can have a length of 5 milliseconds (ms) and a periodicity of 160 ms (i.e., the first SI window 201 is transmitted every 160 ms). In FIG. 2, four successive periods for SIM1 are shown (i.e., SIM1 Period 1, SIM1 Period 2, SIM1 Period 3 and SIM1 Period 4) and each period has the same duration (e.g., 160 ms). A second SI message (SIM2) is transmitted in a second SI window 202 having a second predetermined length and a second periodicity, as indicated by two successive SIM2 periods 1 and 2 in FIG. 2. In accordance with various embodiments, the second predetermined length can be the same as, greater than or less than the first predetermined length. In some embodiments, the second periodicity can be greater than the first periodicity (e.g., twice the duration of the first periodicity), as shown in FIG. 2. However, in alternative embodiments the second periodicity may be less than the first periodicity.

Similarly, a third SI message (SIM3) is transmitted in a third SI window 203 having a third predetermined length and a third predetermined periodicity, as indicated by a single SIM3 period shown in FIG. 2. In accordance with various embodiments, the third predetermined length can be the same as, greater than or less than the first or second predetermined lengths. Furthermore, in some embodiments, the third periodicity may greater than (e.g., twice) the second periodicity and (e.g., four times) the first periodicity. However, in alternative embodiments, the third periodicity may be less than the second and/or the first periodicities.

With reference to the first SI message (SIM1), in addition to transmitting the SIM1 in the first SI window 201 at each successive period of SIM1 (SIM1 Period 1, SIM1 Period 2, and so on), the SIM1 is also transmitted in a first additional SI window 210 added to immediately follow the first SI window 201 at selected periods within the first periodicity. In the example shown in FIG. 2, first additional SI windows 210 are added to immediately follow the first SI window 201 in SIM1 Period 2 and SIM1 Period 4 (e.g., periods having an odd or even index, or "every other" period). In accordance with various embodiments, the length of the first additional SI window 210 can be the same as, greater than, or less then the length of the first SI window 201. The first additional window 210 added to the first window 201 provides a first extended window that increases the number of opportunities a UE can successfully receive SIM1 as the UE attempts to successfully complete a LBT process, for example. Thus, the UE can receive SIM1 more quickly and reliably when utilizing an unlicensed link.

Similarly, for the second SI message (SIM2), a second additional SI window 220 is added to the second SI window 202 at period SIM2 Period 2 of the second periodicity. For the third SI message (SIM3), a third additional SI window 230 is added to the third SI window 203 at period SIM3 Period 2 of the third periodicity. In accordance with various embodiments, the lengths of the second and third additional SI windows 220 and 230, respectively, can be the same as, greater than, or less then the lengths of the second and third SI windows 202 and 203, respectively. The second and third additional SI windows 220 and 230, when added to respective second and third SI windows 202 and 203, each provide respective second and third extended SI windows, thereby increasing the number of opportunities a UE can successfully receive SIM2 and SIM3, respectively, as the UE attempts to successfully complete a LBT process, for example. Thus, the UE can receive SIM2 and SIM3 more quickly and reliably when utilizing an unlicensed link.

In some embodiments, the lengths and/or periodicities of the original SI windows 301, 302 and 303, and the lengths and/or periodicities of the additional SI windows 210, 220 and 230 are configurable by a BS in accordance with various factors and/or schemes. Additionally, although each additional SI window immediately follows its respective original SI window in the example of FIG. 2, in alternative embodiments, an additional SI window may follow its respective original SI window after a predetermined time the original SI window has passed. After determining these SI transmission configuration parameters, the BS may broadcast an enhanced list of SI messages (e.g., schedulingInfoList in SI-SchedulingInfo in SIB1), which contains the SI transmission configuration parameters discussed above so that the UE knows exactly when to expect each SI message.

In accordance with various embodiments, the BS may increase the opportunities to transmit SI messages by a UE in accordance with various schemes and/or factors. For example, the BS may increase the transmission opportunities for SI message by increasing the SI window length of selected SI windows (i.e., adding an additional SI window immediately following a selected SI window). Additionally, the BS may increase the transmission opportunities for SI messages by increasing the length of selected SI windows and changing the periodicity (e.g., decreasing the period) of SI windows. In further embodiments, the BS may increase the transmission opportunities for SI message by increasing SI window lengths and/or adding additional SI windows depending on the locations, lengths and/or periodicities of other SI windows for other SI messages. In some embodiments, the other SI message may correspond to the next SI message as listed in the list of SI messages configured by schedulingInfoList in SI-SchedulingInfo in SIB1, for example. Alternatively, the other SI message may be another SI message indicated by the BS. In some embodiments, if the BS fails to transmit a SI message in a related SI window, the BS may perform the LBT procedure again, and try to transmit the concerned SI message during the additional SI window, which follows the related SI window, until the BS successfully completes the LBT process, or until the end of the additional SI window period.

From the perspective of the UE, after the UE receives the list of SI messages, mapping information and transmission configuration information (e.g., SI window length, periodicity, additional window length, periodicity, location, etc.) broadcast by the BS, the UE can deduce the transmission occasions of each SI message. As used herein, "occasions" refers to the periods of time occupied by respective SI windows and additional SI windows allocated for a SI message, as described herein. For a given SI message, if the UE can't receive the SI message in the original SI window, and UE may continue to try to receive the SI message in the following time which is determined by the additional SI window length. In some embodiments, the additional SI window length can be a value configured by the BS. In accordance with various embodiments, the additional SI window length can be the same as, larger than (e.g., multiple times), or less than the original SI window length. Additionally, the periodicity of the additional SI window can be the same as, larger than (i.e., longer periods) or less than the periodicity of the original SI window.

For example, referring again to FIG. 2, if there are three SI messages, the first SI window 201 can have a periodicity of 160 ms, the second SI window 202 can have a periodicity of 320 ms and the third SI window 203 can have periodicity of 640 ms. In some embodiments, the length of all original SI windows 201, 202 and 203 is 5 ms, and the length for all additional SI windows 210, 220 and 230 is 5 ms, for example.

Various methods for configuring the lengths, periodicity and locations of additional SI windows are described below, in accordance with various embodiments. Referring still to FIG. 2, in some embodiments, an additional SI window is added during a period wherein the corresponding original SI window is not followed by SI windows allocated for other SI messages. For example, for SIM1 in SIM1 Periods 2 and 4, the first SI window 201 is not followed by a second SI window 202 or a third SI window 203. Thus, a first additional SI window 210 is added to the first SI window 201 during SIM1 Periods 2 and 4. Similarly, for SIM2 in SIM1 Period 3, the second SI window 202 is not followed by a first SI window 201 or third SI window 203. Thus, a second additional SI window 220 is added to the second SI window 202 during SIM1 Period 3, which overlaps with SIM2 Period 2.

In further embodiments, additional SI windows are added during periods wherein no SI windows for other SI messages are present. For example, in SIM1 Periods 2 and 4, there are no other SI windows allocated for other SI messages. Thus, under this method, the first additional SI windows 210 are added to original first SI windows 201 in each period. However, under this configuration scheme, the second additional SI window 220 would not be added to the second SI window 202 since other SI windows 201 are present during SIM1 Period 3, and other SI windows 201 and 210 are present during SIM2 Period 2.

In other embodiments, additional SI windows may be added only in periods having an odd or even index value (i.e., every other period). In some embodiments, the periodicity of the additional SI window is configured by the BS. For example, the BS can set the periodicity of the first additional SI window 210 to 320 ms, which means the first additional SI window will be repeated every 320 ms, while the original first SI window 201 will be repeated every 160 ms, for example. In some embodiments, the periodicity of an additional SI window can be set as an integer multiple of the periodicity of its corresponding original SI window. Similarly, the BS can set the periodicity of the second additional SI window 220 to 640 ms and that of the third additional SI window 230 to 1280 ms, for example.

In further embodiments, an additional SI window may be added in a period of time following an original SI window when there are no other SI windows allocated for other SI messages. For example, during SIM1 Periods 2 and 4, after the original first SI window 201 there are no other SI windows for other SI messages. Therefore, one or more additional SI windows may be added during these "empty" portions of SIM1 Periods 2 and 4.

Figure 3:
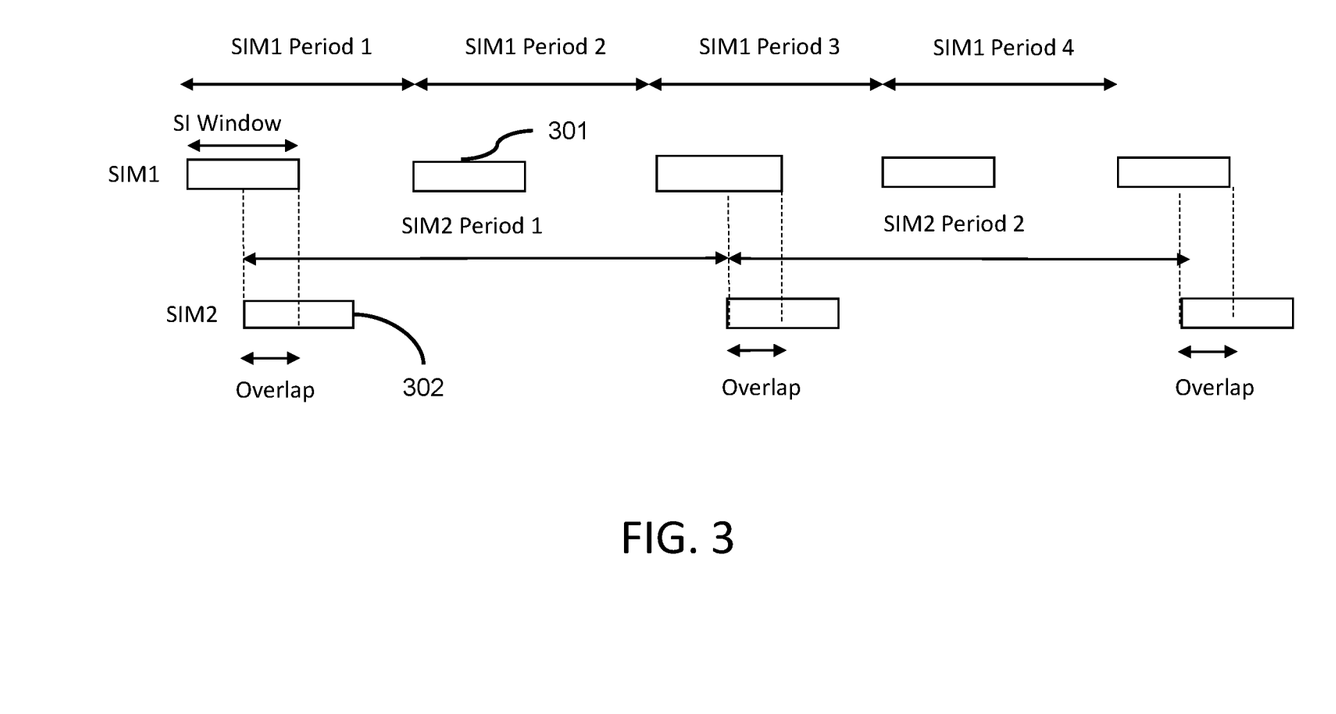
FIG. 3 illustrates a timing diagram for an enhanced method of transmitting a plurality of SI messages, in accordance with further embodiments of the invention.

As described above, the SI windows, including additional SI windows, allocated for one SI message (e.g., SIM1) do not overlap in time with the SI windows, including additional SI windows, allocated for another SI message (e.g., SIM2). However, this is not necessary in some case. FIG. 3 illustrates a timing diagram of an enhanced method of transmitting and receiving SI messages in which the overlapping of SI windows of different SI messages may be allowed, in accordance with some embodiments of the invention. As shown in FIG. 3, a first SI message (SIM1) is transmitted in a first SI window 301 having a first periodicity, as indicated by equal periods SIM1 Periods 1, 2, 3 and 4. A second SI message (SIM2) is transmitted in a second SI window 302 having a second periodicity, as indicated by equal periods SIM2 Periods and 2. In FIG. 3, the first SI window 301 may be either an original SI window or an extended SI window having an additional SI window added in each period, SIM1 Period 1, 2, 3 and 4, respectively. Similarly, the second SI window 302 may be either an original SI window or an extended SI window having an additional SI window added in each period, SIM2 Period 1 or 2, respectively.

As shown in FIG. 3, in SIM1 Period 1 (and SIM2 Period 1), an end portion of the first SI window 301 overlaps in time with a beginning portion of the second SI window 302. Similarly, in SIM1 Period 3 (and SIM 2 Period 2), an end portion of the first SI window 301 overlaps in time with a beginning portion of the second SI window 302. Thus, the UE will receive at least a portion of SIM 1 simultaneous with at least a portion of SIM2. In this case, the UE must distinguish the two SI messages in order to process them. In some embodiments, the UE can distinguish between transmitted SI messages overlapping in time by receiving information from the BS to enable such distinguishing function. Thereafter, the UE can perform a "soft combination" of the SI messages to process them simultaneously and thereby improve the cell coverage for the UE. For example, in some embodiments, the BS may include SI message type information for each SI message in the Downlink Control Information (DCI) transmitted on Physical Downlink Control Channel (PDCCH) for scheduling each respective SI message, in accordance with their order of entry in the list of SI messages configured by schedulingInfoList in SI-SchedulingInfo in SIB1, for example. The UE will decodes the DCI based on the System Information Radio Network Temporary Identity (SI-RNTI) and thereafter performs a "soft combination" of SI messages to extract each distinct SI message as indicated by the DCI. As used herein, "soft combination" refers to merging received error packets with subsequent retransmitted packets to obtain a more reliable packet than decoding alone. Thus, a method of increasing SI window lengths and/or periodicity of SI windows, and processing different SI messages contained in time-domain overlapping SI windows is provided. This can also enhance the number of opportunities for transmitting and receiving SI messages when utilizing the unlicensed spectrum.

Figure 4:
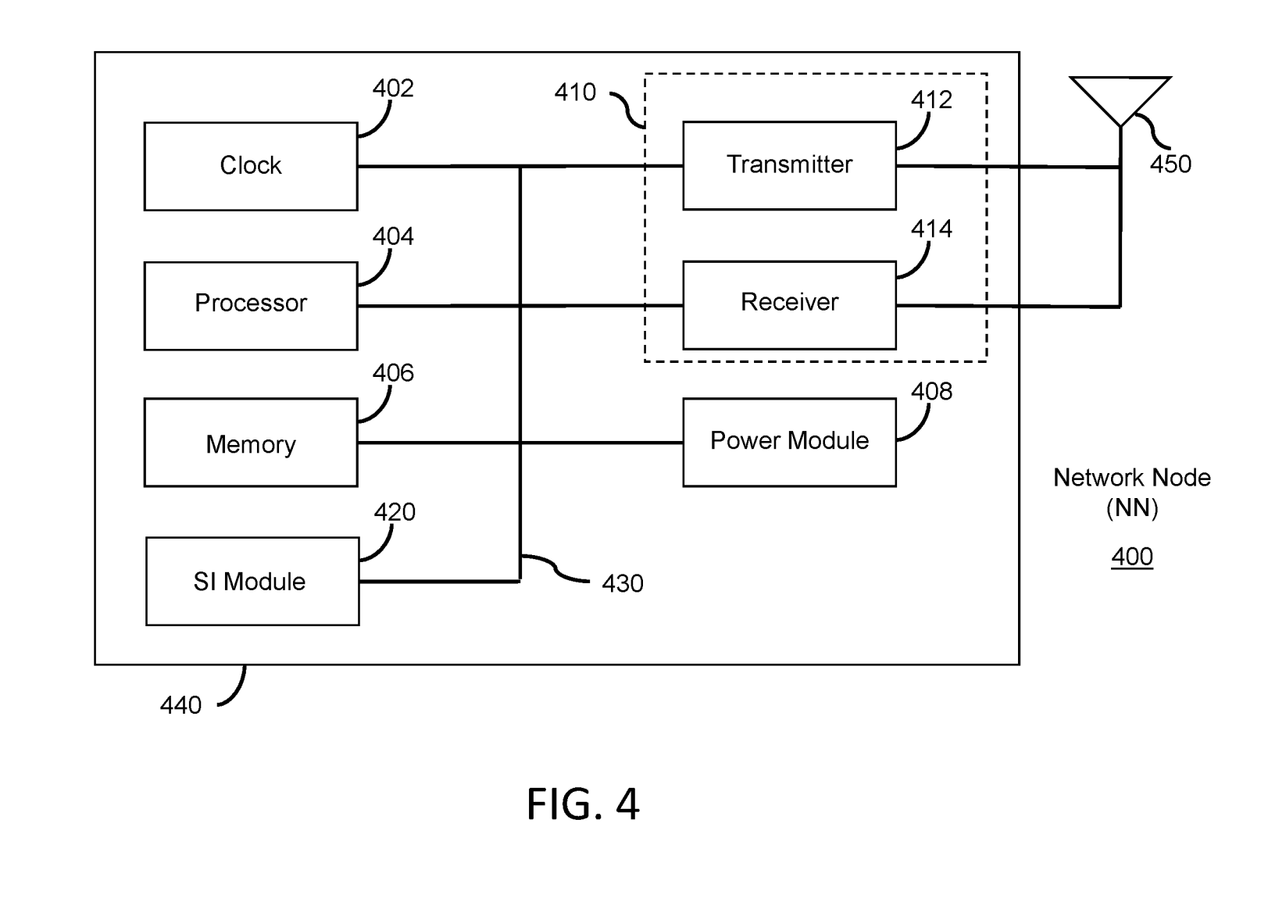
FIG. 4 illustrates a block diagram of a wireless communication node configured to perform the methods disclosed herein, in accordance with various embodiments of the invention.

FIG. 4 illustrates a block diagram of a network node (NN) 400, in accordance with various embodiments of the invention. The NN 400 is an example of a communication node that can be configured to implement the various methods described herein. In some embodiments, the NN 400 may be a BS as described herein. In other embodiments, the NN 400 may be UE as described herein. As shown in FIG. 4, the NN 400 includes a housing 440 containing a system clock 402, a processor 404, a memory 406, a transceiver 410 comprising a transmitter 412 and receiver 414, a power module 408, and a SI module 420.

In this embodiment, the system clock 402 provides the timing signals to the processor 404 for controlling the timing of all operations of the NN 400. The processor 404 controls the general operation of the NN 400 and can include one or more processing circuits or modules such as a central processing unit (CPU) and/or any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable circuits, devices and/or structures that can perform calculations or other manipulations of data.

The memory 406, which can include both read-only memory (ROM) and random access memory (RAM), can provide instructions and data to the processor 404. A portion of the memory 406 can also include non-volatile random access memory (NVRAM). The processor 404 typically performs logical and arithmetic operations based on program instructions stored within the memory 406. The instructions (a.k.a., software) stored in the memory 406 can be executed by the processor 404 to perform the methods described herein. The processor 404 and memory 406 together form a processing system that stores and executes software. As used herein, "software" means any type of instructions, whether referred to as software, firmware, middleware, microcode, etc. which can configure a machine or device to perform one or more desired functions or processes. Instructions can include code (e.g., in source code format, binary code format, executable code format, or any other suitable format of code). The instructions, when executed by the one or more processors, cause the processing system to perform the various functions described herein.

The transceiver 410, which includes the transmitter 412 and receiver 414, allows the NN 400 to transmit and receive data to and from a remote device (e.g., a UE). An antenna 450 is typically attached to the housing 440 and electrically coupled to the transceiver 410. In various embodiments, the NN 400 includes (not shown) multiple transmitters, multiple receivers, and multiple transceivers. In some embodiments, the antenna 450 is replaced with a multi-antenna array that can form a plurality of beams each of which points in a distinct direction.

The SI module 420 may be implemented as part of the processor 404 programmed to perform the functions herein, or it may be a separate module implemented in hardware, firmware, software or a combination thereof. In accordance with various embodiments, the SI module 420 is configured to perform SI functions described herein, such as determining the length, periodicity and locations of additional SI windows allocated for each SI message, or distinguishing between different SI messages transmitted in overlapping SI windows, and thereafter processing the different SI messages, as discussed above. In some embodiments, the SI module 420 can be implemented as software (i.e., computer executable instructions) stored in a non-transitory computer-readable medium that when executed by processor 404, transform the processor 404 into a special-purpose computer to perform the SI operations described herein.

The various components and modules discussed above within housing 440 are coupled together by a bus system 430. The bus system 430 can include a data bus and, for example, a power bus, a control signal bus, and/or a status signal bus in addition to the data bus. It is understood that the modules of the NN 400 can be operatively coupled to one another using any suitable techniques and mediums. It is further understood that additional modules (not shown) may be included in the NN 400 without departing from the scope of the invention.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand exemplary features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques.

To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, module, etc. can be configured to perform one or more of the functions described herein. The term "configured to" or "configured for" as used herein with respect to a specified operation or function refers to a processor, device, component, circuit, structure, machine, module, signal, etc. that is physically constructed, programmed, arranged and/or formatted to perform the specified operation or function.

Furthermore, a person of ordinary skill in the art would understand that various illustrative logical blocks, modules, devices, components and circuits described herein can be implemented within or performed by an integrated circuit (IC) that can include a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A processor programmed to perform the functions herein will become a specially programmed, or special-purpose processor, and can be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present disclosure.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A method for transmitting system information (SI), comprising:
   transmitting a first SI message in a plurality of first SI windows, each first SI window having a first length and a first periodicity; and
   transmitting the first SI message in a plurality of second SI windows, each second SI window having a second length and a second periodicity, wherein each second SI window follows immediately after a respective first SI window to provide a plurality of first extended SI windows, each first extended SI window having the second periodicity and an increased length equal to the sum of the first and second lengths.

2. The method of claim 1 wherein the second length is configured by a base station.

3. The method of claim 1 wherein the second periodicity is longer than the first periodicity.

4. The method of claim 3 wherein the second periodicity is twice the first periodicity.

5. The method of claim 1 wherein the second periodicity is configured by a base station.

6. The method of claim 1 further comprising transmitting a second SI message in a plurality of third SI windows, each of the third SI windows having a third length and a third periodicity, wherein the second periodicity is determined such that a second SI window follows a respective first SI window only during periods of the first periodicity in which a third SI window is not present.

7. The method of claim 1 further comprising:
transmitting a second SI message in a plurality of third SI windows, each of the third SI windows having a third length and a third periodicity;
transmitting the second SI message in a plurality of fourth SI windows, each fourth SI window having a fourth length and a fourth periodicity, wherein each fourth SI window follows immediately after a respective third SI window to provide a plurality of second extended SI windows, each second extended SI window having the fourth periodicity and an increased length equal to the sum of the third and fourth lengths, and
wherein the fourth periodicity is determined such that the fourth SI window follows a respective third SI window only during periods of the first periodicity in which a first or second SI window does not follow the third SI window.

8. The method of claim 1 further comprising:
transmitting a second SI message in a plurality of third SI windows, each of the third SI windows having a third length and a third periodicity, wherein at least a portion of each third SI window overlaps in time with at least a portion of a respective first extended SI window; and
transmitting SI message type information for each of the first and second SI messages so as to distinguish the first SI message from the second SI message.

9. The method of claim 8 wherein the SI message type information is contained in downlink control information (DCI) also containing scheduling information for each of the first and second SI messages, and wherein the DCI is transmitted on a physical downlink control channel (PDCCH).

10. The method of claim 1 further comprising receiving a second SI message in a plurality of third SI windows, each of the third SI windows having a third length and a third periodicity, wherein the second periodicity is determined such that a second SI window follows a respective first SI window only during periods of the first periodicity in which a third SI window is not present.

11. A network node, comprising:
a memory storing computer-executable instructions that when executed perform the method of claim 1; and
at least one processor, coupled to the memory, and configured to execute the computer-executable instructions.

12. A method for receiving system information (SI), comprising:
receiving a first SI message in a plurality of first SI windows, each first SI window having a first length and a first periodicity; and
receiving the first SI message in a plurality of second SI windows, each second SI window having a second length and a second periodicity, wherein each second SI window follows immediately after a respective first SI window to provide a plurality of first extended SI windows, each first extended SI window having the second periodicity and an increased length equal to the sum of the first and second lengths.

13. The method of claim 12 wherein the second length is configured by a base station.

14. The method of claim 12 wherein the second periodicity is longer than the first periodicity.

15. The method of claim 14 wherein the second periodicity is twice the first periodicity.

16. The method of claim 12 wherein the second periodicity is configured by a base station.

17. The method of claim 12 further comprising:
receiving a second SI message in a plurality of third SI windows, each of the third SI windows having a third length and a third periodicity;
receiving the second SI message in a plurality of fourth SI windows, each fourth SI window having a fourth length and a fourth periodicity, wherein each fourth SI window follows immediately after a respective third SI window to provide a plurality of second extended SI windows, each second extended SI window having the fourth periodicity and an increased length equal to the sum of the third and fourth lengths, and
wherein the fourth periodicity is determined such that the fourth SI window follows a respective third SI window only during periods of the first periodicity in which a first or second SI window does not follow the third SI window.

18. The method of claim 12 further comprising:
receiving a second SI message in a plurality of third SI windows, each of the third SI windows having a third length and a third periodicity, wherein at least a portion of each third SI window overlaps in time with at least a portion of a respective first extended SI window; and
receiving SI message type information for each of the first and second SI messages so as to distinguish the first SI message from the second SI message.

19. The method of claim 18 wherein the SI message type information is contained in downlink control information (DCI) also containing scheduling information for each of the first and second SI messages, and wherein the DCI is transmitted on a physical downlink control channel (PDCCH).

20. A network node, comprising:
a memory storing computer-executable instructions that when executed perform the method of claim 12; and
at least one processor, coupled to the memory, and configured to execute the computer-executable instructions.

* * * * *